Figure 1:
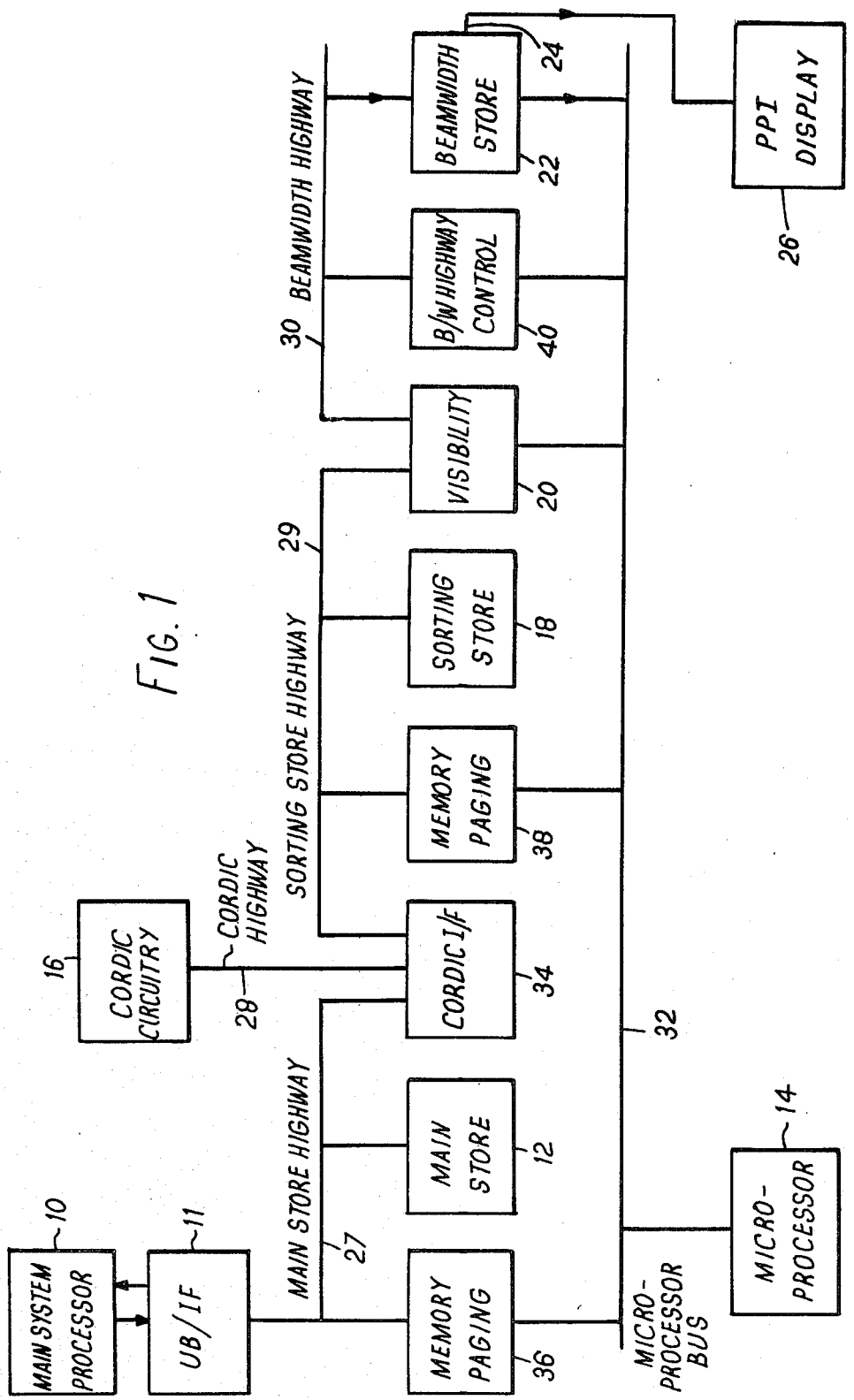

United States Patent [19]

Wakeling et al.

[11] 4,421,484

[45] Dec. 20, 1983

[54] DIGITAL SIMULATION APPARATUS

[75] Inventors: Antony J. Wakeling, Fleet; Alan D. Thompson, Farnborough; Roy W. Sumner, Hartley Wintney, all of England

[73] Assignee: The Solartron Electronic Group Limited, Farnborough, England

[21] Appl. No.: 130,810

[22] Filed: Mar. 17, 1980

[30] Foreign Application Priority Data

Mar. 21, 1979 [GB] United Kingdom ............... 7909896

[51] Int. Cl.³ .............................................. G09B 9/00
[52] U.S. Cl. ....................................................... 434/3
[58] Field of Search ....................................... 434/2, 3

[56] References Cited

U.S. PATENT DOCUMENTS

| | | | |
|---|---|---|---|
| 3,764,719 | 10/1973 | Dell | 35/10.4 |
| 3,769,442 | 10/1973 | Heartz et al. | 35/10.4 |
| 3,801,720 | 4/1974 | Rymer | 35/10.4 |
| 3,808,711 | 5/1974 | Membrino et al. | 35/10.4 |
| 4,017,985 | 4/1977 | Heartz | 434/2 |
| 4,198,762 | 4/1980 | Lamasney et al. | 434/3 |

FOREIGN PATENT DOCUMENTS

| | | |
|---|---|---|
| 897753 | 5/1962 | United Kingdom ............ 434/3 |
| 1007966 | 10/1965 | United Kingdom ............ 434/3 |
| 1254459 | 11/1971 | United Kingdom . |
| 1359504 | 7/1974 | United Kingdom ............ 434/2 |
| 1432052 | 4/1976 | United Kingdom . |

Primary Examiner—Maynard R. Wilbur
Assistant Examiner—Robert C. Burk
Attorney, Agent, or Firm—Dale Gaudier

[57] ABSTRACT

Digital simulation apparatus, e.g. a digital coastline generator, for simulating a terrain-representative display of the kind produced by a movable scanning-type display device, e.g. a radar display device, comprises a main store for storing digital data representative, in Cartesian co-ordinate form, of terrain features such as contours and buildings in an area, known as the playing area, typically 256 nautical miles by 256 nautical miles. The data is divided into groups relating to contiguous zones each typically 2 nautical miles by 2 nautical miles. The apparatus further comprises means for producing a signal representative of the current position of the display device in the playing area, means for producing successive signals representative of successive segments of scan of the display device, and means responsive to these signals to select from the main store those groups of data corresponding to zones intersected by the current scan segment. The selected groups of data are applied to co-ordinate conversion means which converts them into polar co-ordinate form, in which form they are then used to generate the simulated display. The selection process greatly reduces the computational burden of the co-ordinate conversion means.

3 Claims, 20 Drawing Figures

Fig. 2

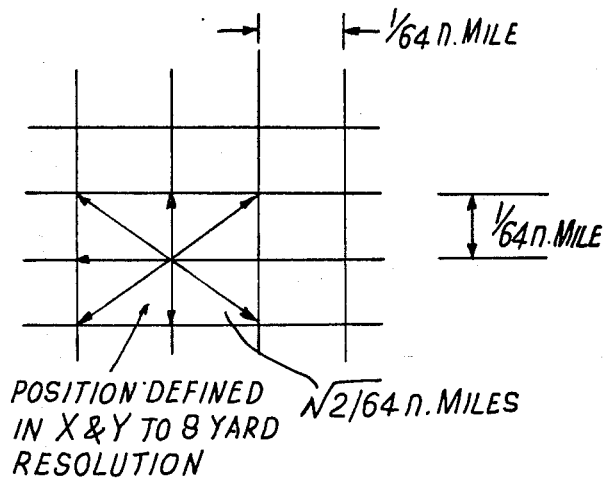

↤ 1/64 n.MILE

1/64 n.MILE

POSITION DEFINED IN X & Y TO 8 YARD RESOLUTION

√2/64 n.MILES

Fig. 3(a)

SCRATCH PAD

INCREASING ADDRESS

E POSITION OF OWN SHIP
N POSITION OF OWN SHIP
ADDRESS OF 1ST TWO MILES SQUARE
ADDRESS OF 2ND TWO MILES SQUARE
ADDRESS OF 3RD TWO MILES SQUARE
⋮
ADDRESS OF LAST TWO MILES SQUARE
177777 UNIQUE CODE TO DEFINE THE END OF THE LIST.

Fig. 3(b)

SQUARE DATA
ADDRESS OF DATA IN SQUARE

NUMBER OF STRINGS IN THE SQUARE
E POSITION OF THE START OF 1ST STRING
N POSITION OF THE START OF 1ST STRING
STRING DESCRIPTION (HEIGHT, TYPE OF FEATURE AND LENGTH)

INCREMENTS

E POSITION OF THE START OF 2ND STRING

UNTIL ALL THE STRINGS IN THE SQUARE ARE COMPLETE.

| BEARING INCREMENT | 1 | 2 | 3 | 4 |
|---|---|---|---|---|
| | | | | LOADING |
| BEARING STEP 1 | 5 | 6 | 1 | |
| WEIGHTINGS 2 | 3 | 7 | 2 | |
| WEIGHTINGS 3 | 2 | 7 | 3 | |
| WEIGHTINGS 4 | 1 | 6 | 5 | |

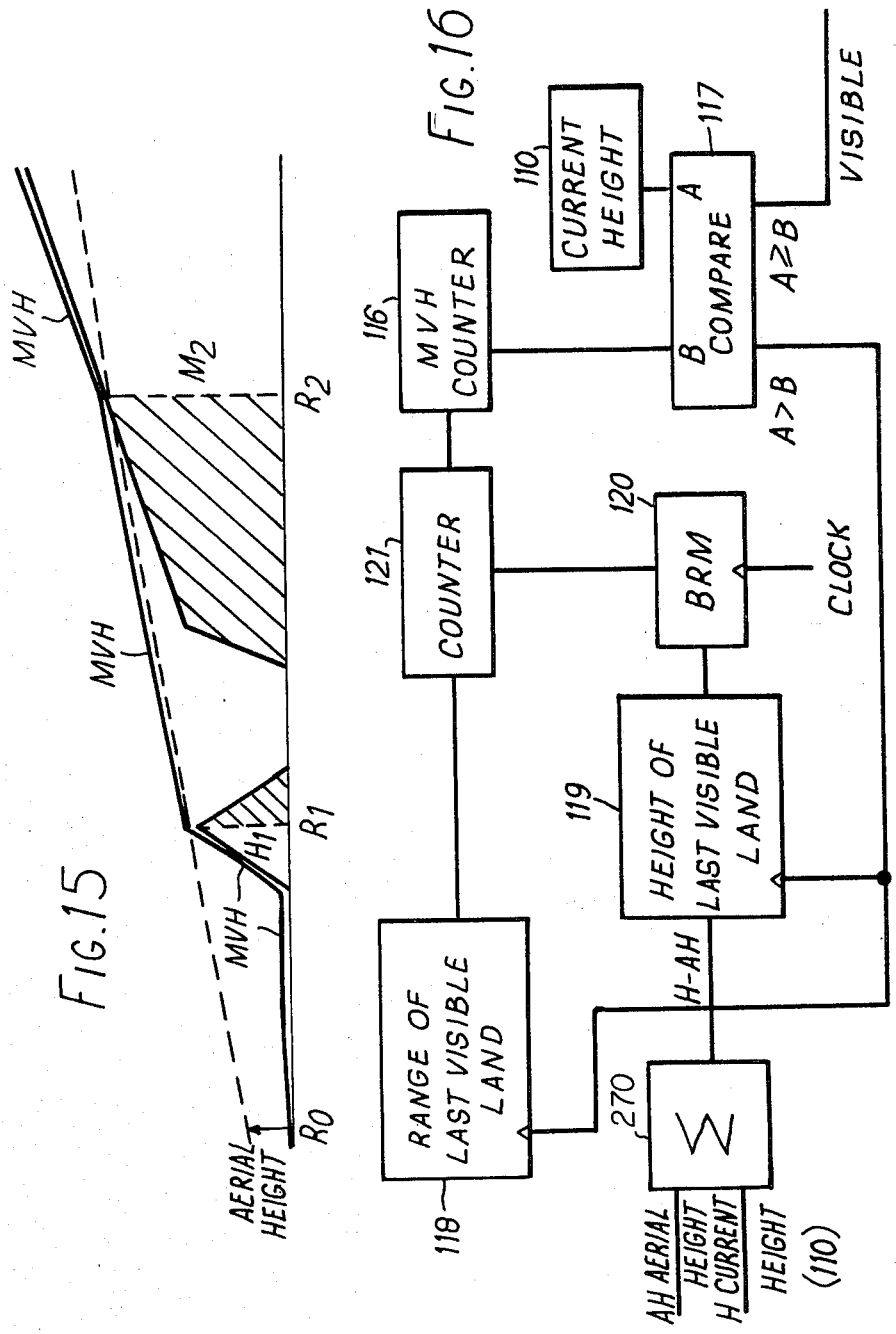

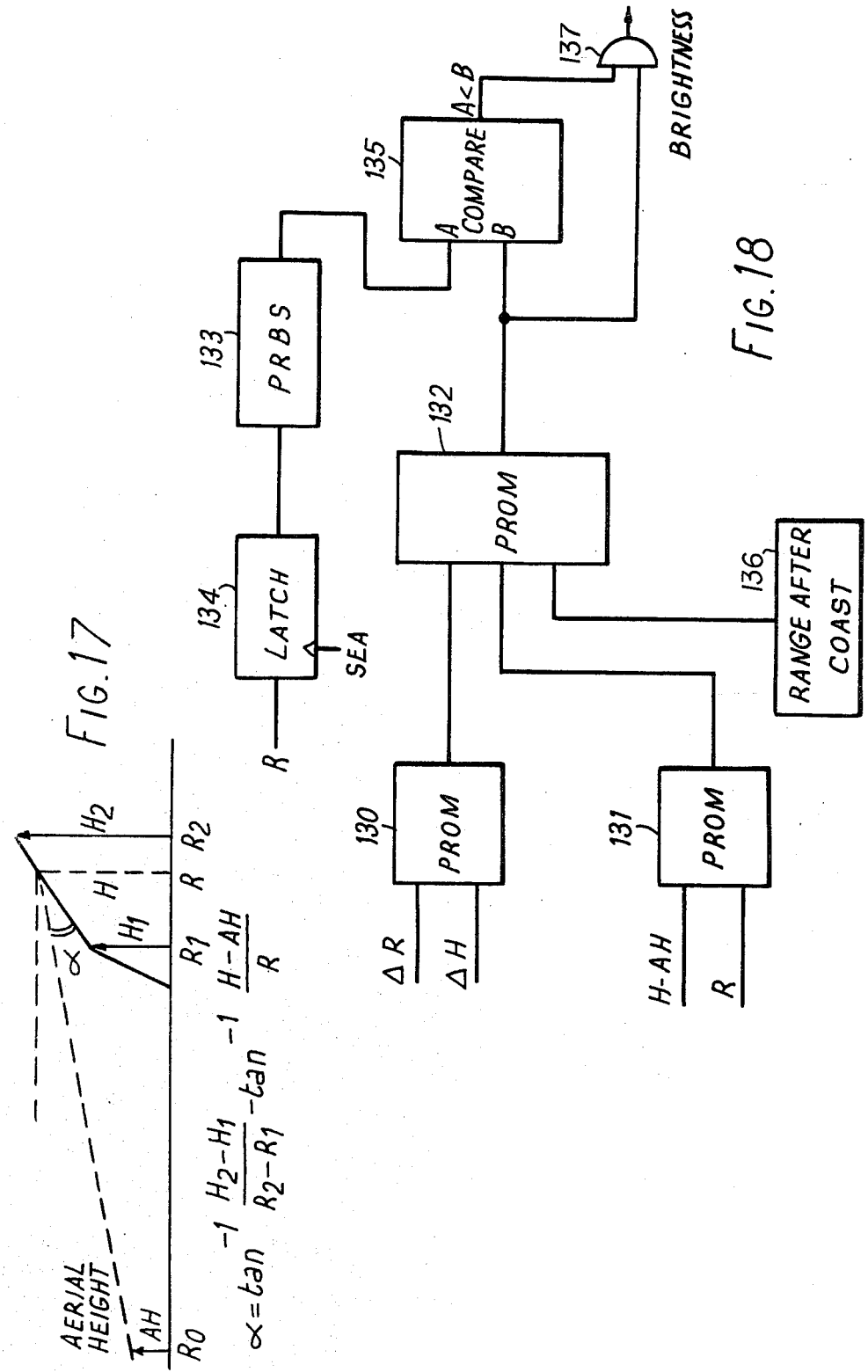

DIGITAL SIMULATION APPARATUS

This invention relates to digital simulation apparatus. The invention is more particularly, but not exclusively, concerned with digital simulation apparatus for providing to a scanning-type display device signals simulating the radar returns which would be obtained from an area of terrain, e.g. a stretch of coastline, by radar apparatus which is movable with respect to the terrain, e.g. radar apparatus carried by a ship sailing or an aircraft flying in the vicinity of the stretch of coastline.

Known digital simulation apparatus of this type, often referred to as a "coastline generator" in the case where the radar returns obtained from a stretch of coastline by ship-borne radar apparatus are to be simulated, typically comprises a main store for storing terrain-representative data representing radar-visible features of the terrain (e.g. contours, and points such as buildings, piers and buoys) in a total "playing area" which may be as large as 256 nautical miles by 256 nautical miles. From this terrain-representative data, which is usually in Cartesian co-ordinate form, it is necessary to generate signals simulating radar returns in respect of only a limited area, whose center is determined by the co-ordinates of a movable point (e.g. representing the position of the aforementioned ship or aircraft): the display device to which the signals are applied is typically a PPI display, and the movable point determines the center of the PPI display.

Typically, the known apparatus employs a further store, known as a "visible area store", which stores that data corresponding to the limited area centered on the movable point in co-ordinates corresponding to those of the display device, i.e. polar co-ordinates. To this end, at least one converter is used to convert the data from the co-ordinate form used in the main store to the co-ordinate form used in the visible area store. Since the visible area store must be continuously updated as the aforementioned movable point moves, the co-ordinate converter carries a very high burden of computation, and therefore requires a relatively large amount of fast and expensive circuitry.

It is an object of the present invention to alleviate this problem

According to one aspect of the present invention, digital simulation apparatus for simulating a terrain-representative display of the kind produced by a movable scanning-type display device, comprises:

a main store for storing data representative, in a first co-ordinate form, of the terrain in a predetermined area, said data being divided into groups corresponding to respective contiguous zones of said area;

means for producing a signal representative of the current position of the scanning-type display device;

co-ordinate conversion means for converting data in the first co-ordinate form into data in a second co-ordinate form suitable for use in the scanning-type display device, said first and second co-ordinate forms being different from each other;

a further store for receiving the converted data; and means for generating the simulated display from the converted data in the further store;

wherein the means for producing the position-representative signals is also arranged to produce successive signals respectively representative of successive segments of scan of the scanning-type display device;

and wherein there is provided means responsive to the position-representative signals and the scan-segment-representative signals to select from the main store only groups of data corresponding to zones of said area determined by the current position and current scan segment and to apply the selected data to the co-ordinate conversion means for conversion therein.

Thus the computational burden of the co-ordinate conversion is reduced, in that the conversion means is required to perform computations only on data corresponding to those zones of the area intersected by the current scan segment, which may typically be 360°/64 (or approximately 5.6°) in angular extent.

The means for producing the position-representative signals is preferably also arranged to produce signals representative of the range and bearing corresponding to data to be converted, the selecting means being additionally responsive to said range and bearing signals to select only portions of said selected groups of data for conversion.

Conveniently, the means for producing the position-representative, scan-segment-representative, bearing-representative and range-representative signals comprises a main processor arranged to produce these signals in response to input signals representative of position of a simulated vehicle, such as a ship, carrying the scanning-type display device, and of the scanning rate and range of the scanning-type display device, at least some of these input signals being selectively variable. The selection means preferably comprises a microprocessor.

According to another aspect of the invention, in digital simulation apparatus for simulating a terrain-representative display and comprising a store for storing data representative of the terrain in a predetermined area, at least some of the data is representative of contours, and at least one of these contours is represented by a multi-bit digital signal, of which a first group of bits defines a point on said contour selected as the start of the contour, and further groups of bits, each containing fewer bits than the first group, define successive vectors of predetermined magnitude and direction selected to follow the shape of the contour from said point.

Advantageously, each further group of bits contains a common number of bits, advantageously three bits capable of defining eight equiangularly spaced apart such vectors.

Each multi-bit digital signal preferably includes yet another group of bits defining the height of the contour.

For each contour, the direction of the first vector from the selected starting point is preferably selected such that higher terrain is always on the same pre-determined side of the contour.

According to a further aspect of this invention, in digital simulation apparatus for deriving a terrain-representative display from data representative of terrain contours, and comprising a store for storing range and bearing information derived from said contour-representative data, the range and bearing of three successive points on a contour are inspected to determine whether along a radial line of sight from the point from which the terrain is viewed, the middle one of those three points is the closest point on a near contour or the farthest point on a far contour, and the range and bearing information for that middle point are retained in said store for further computation only if the point is the closest or furthest as aforesaid.

The storage and computation are thus minimised, because any closed contour is represented by an even number of intersections between the contour and a radial line of sight from the point (such as a ship) from which the terrain is viewed, and the number of data points for each bearing is reduced to this even number.

Figure 4:
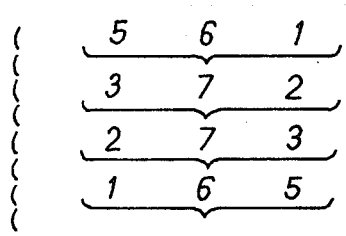
Figure 5A:
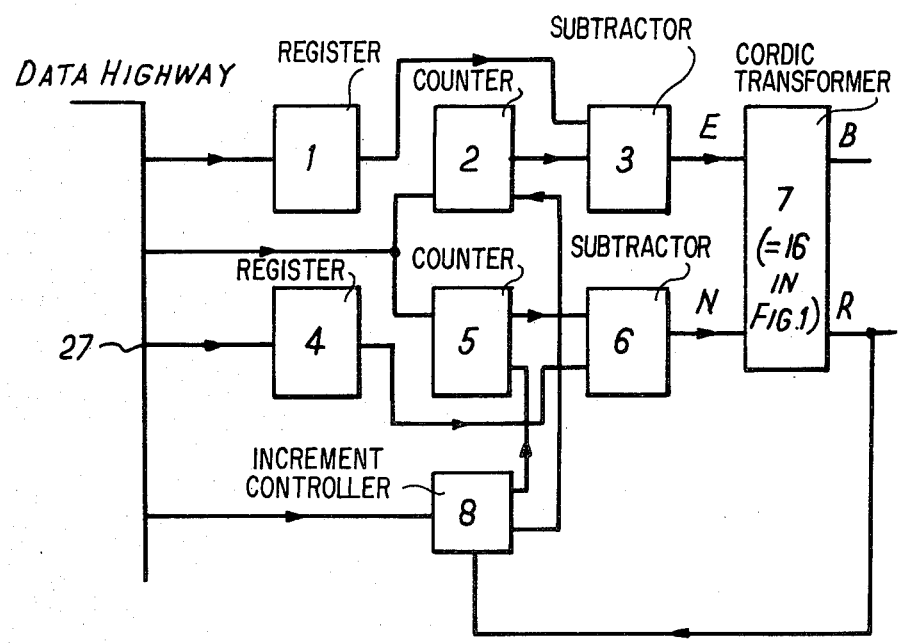
Figure 5B:
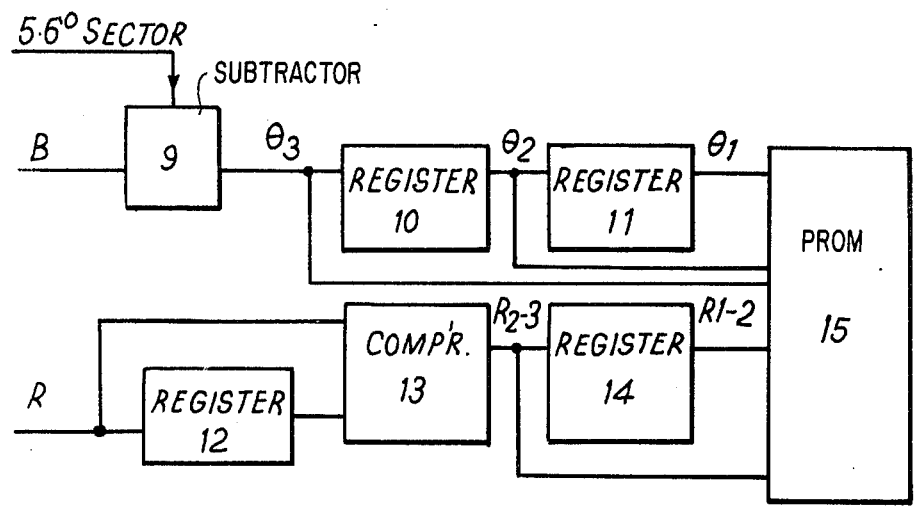
Figure 6:
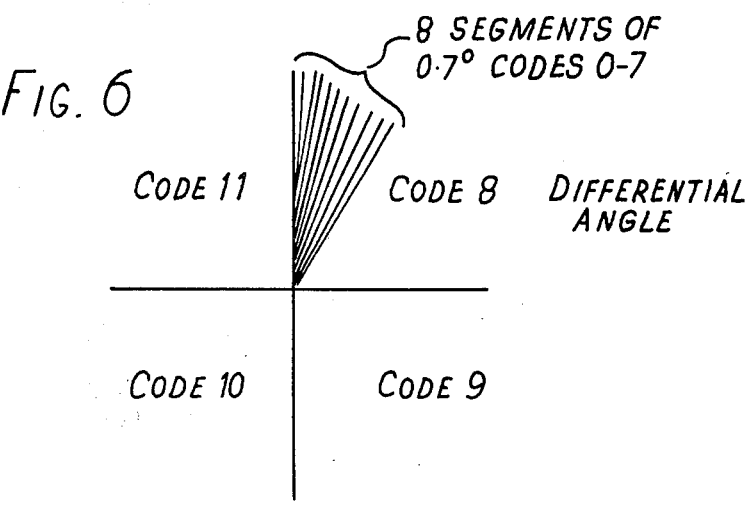
Figure 7:
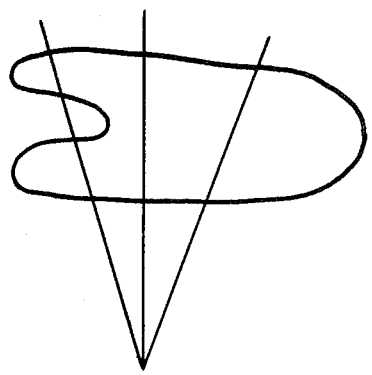
Figure 8:
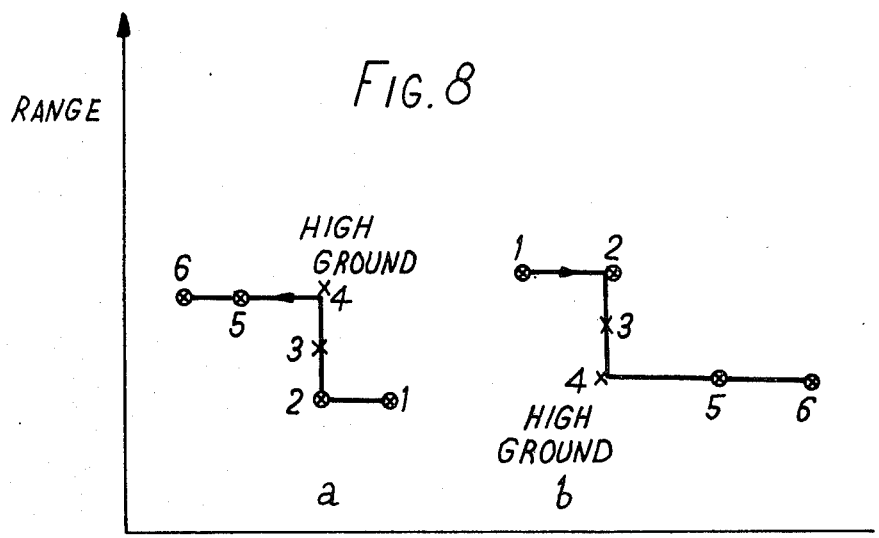
Figure 9:
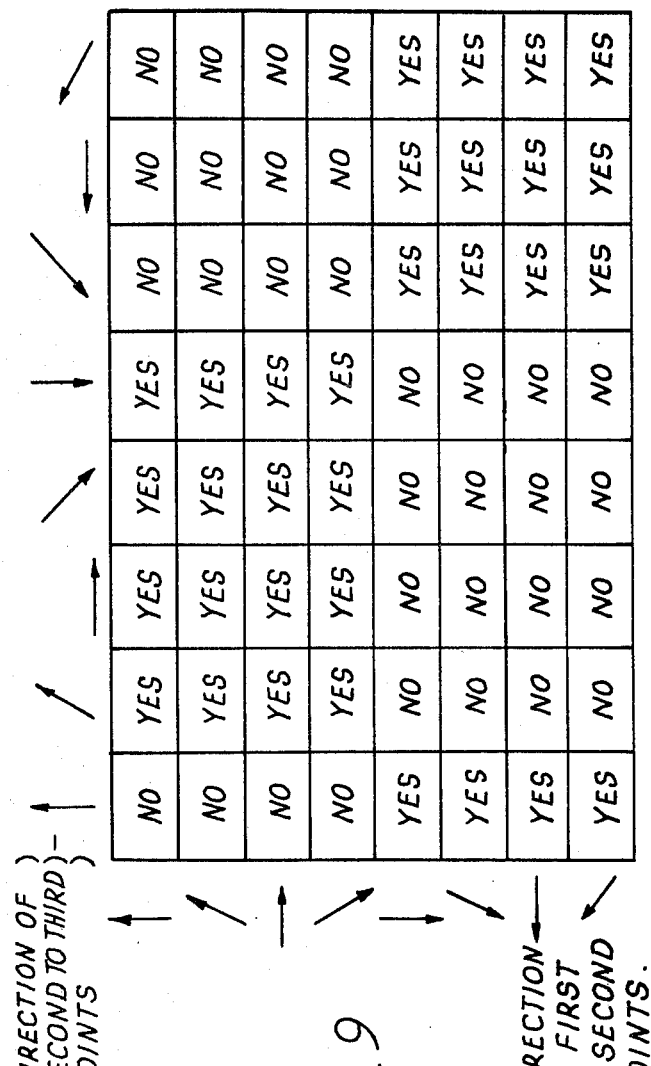
Figure 10:
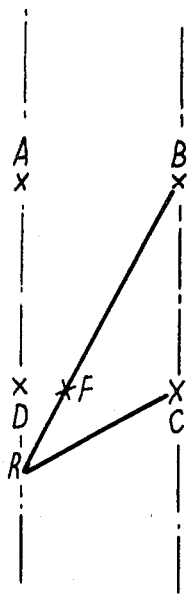
Figure 11:
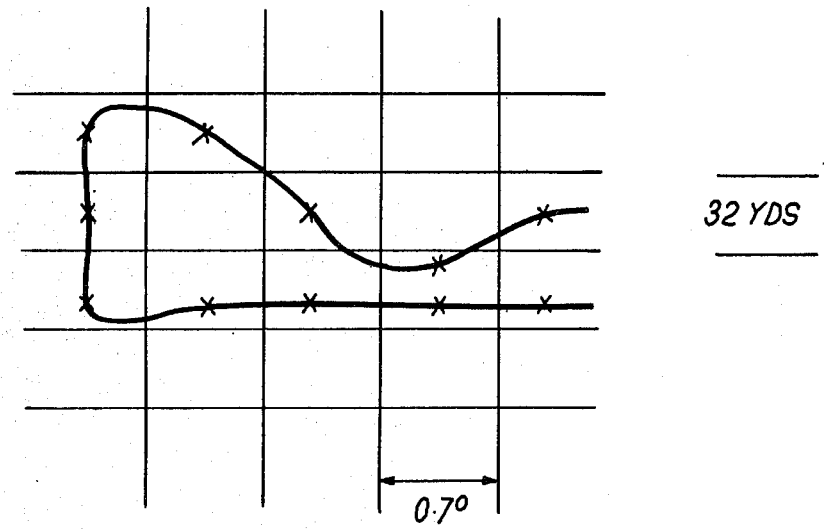
Figure 12:
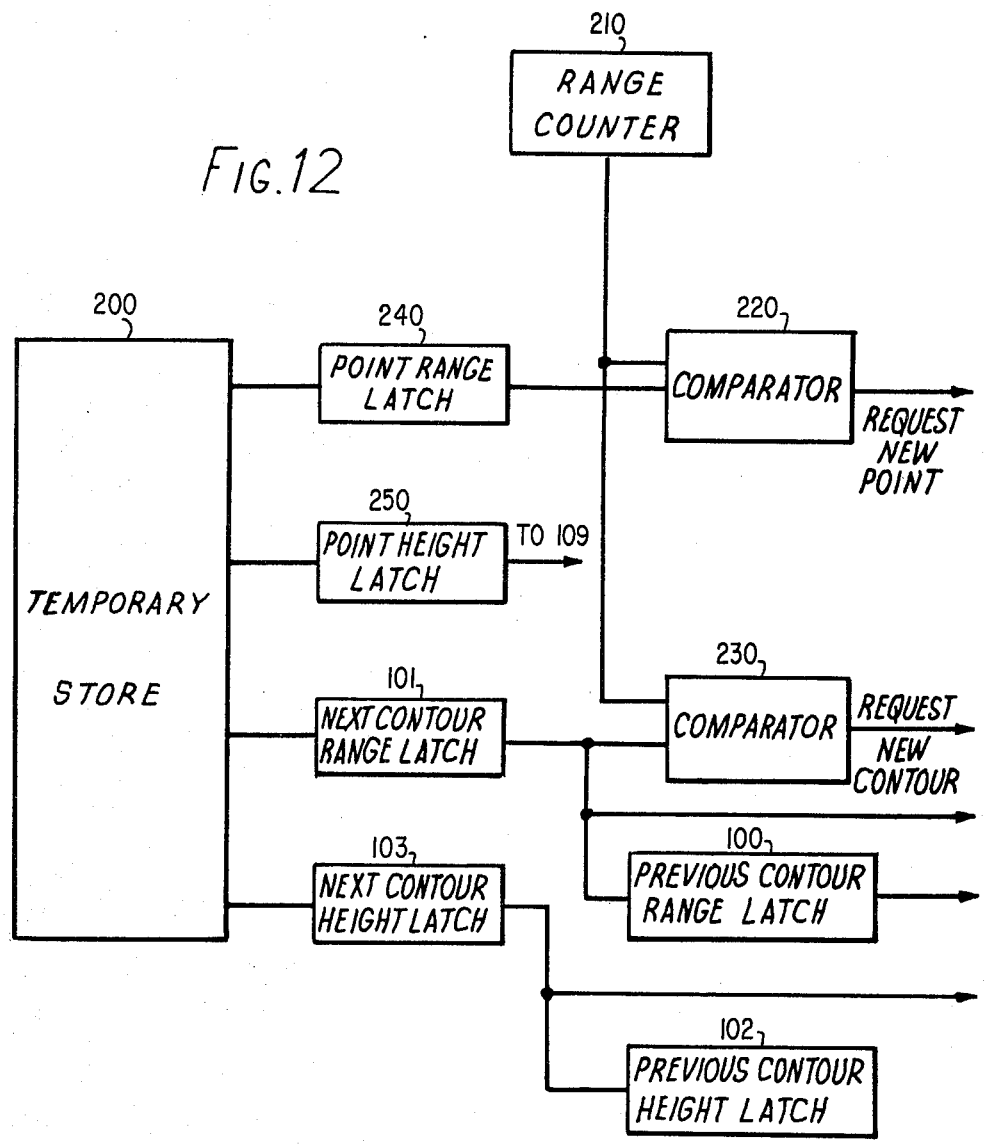
Figure 13:
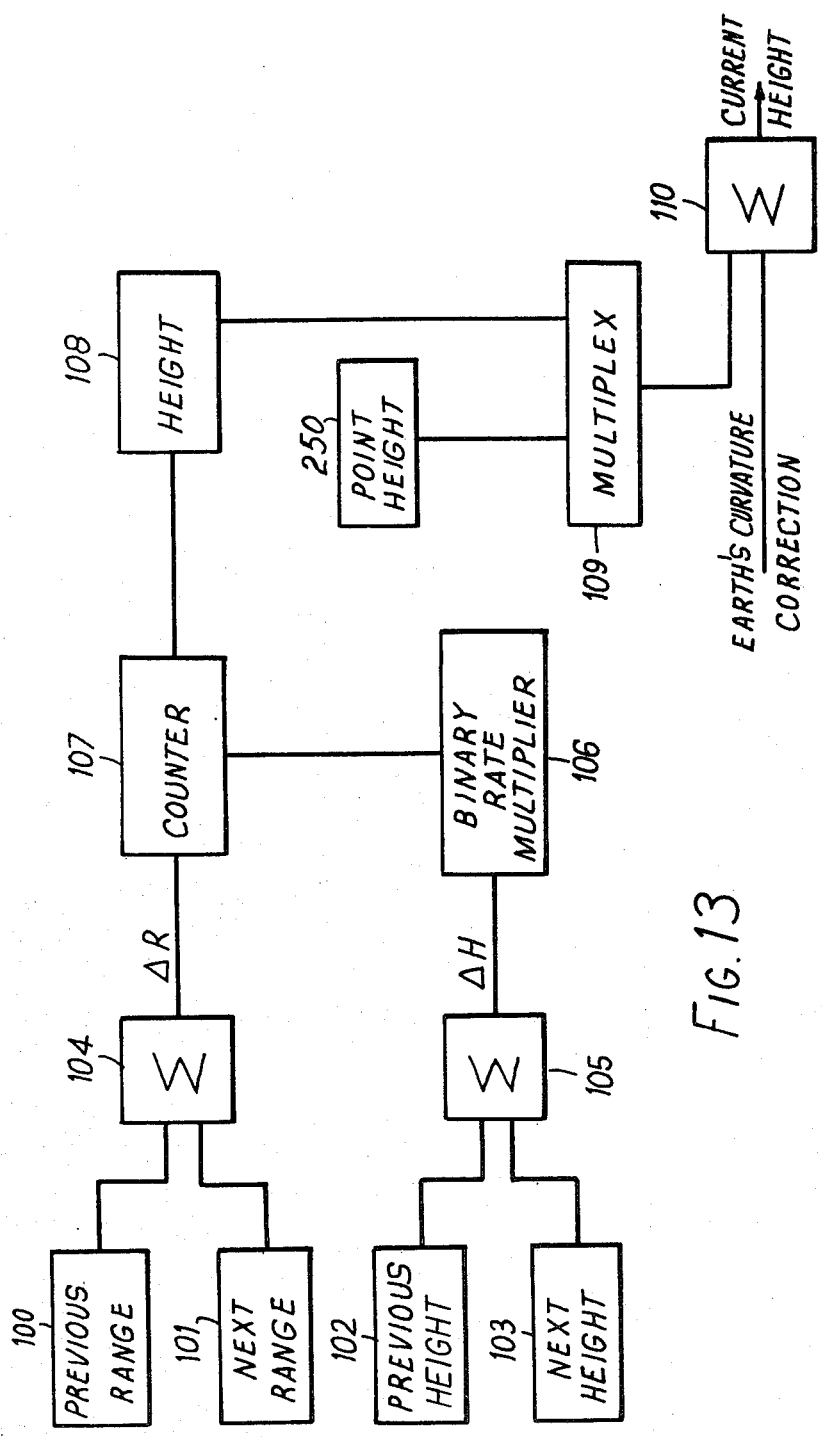
Figure 14:
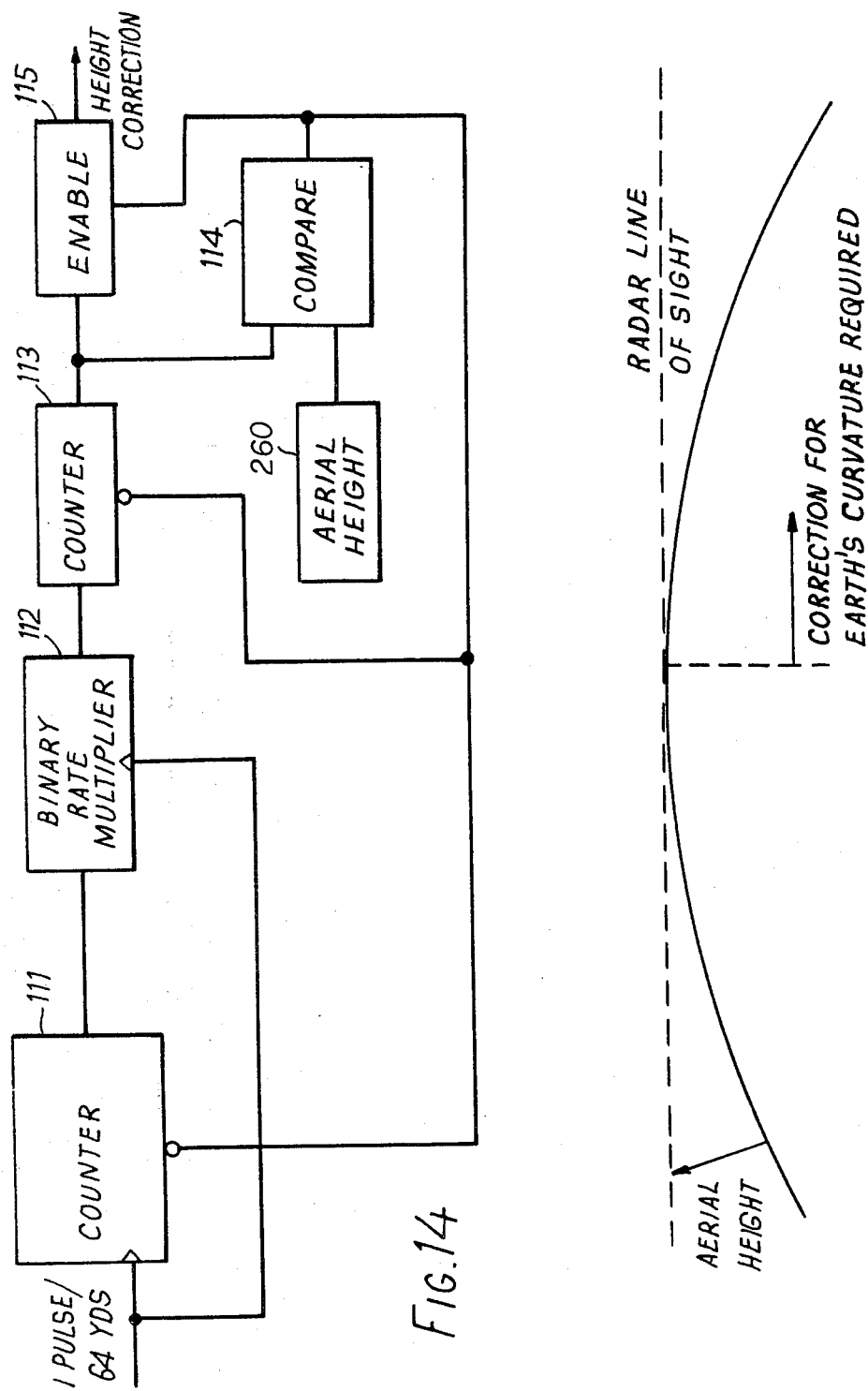

The invention will now be described, by way of example only, with reference to the accompanying drawings, of which:

FIG. 1 is a simplified block diagram of a digital coastline generator in accordance with the present inventions;

FIG. 2 relates to a method of defining contours;

FIGS. 3a and 3b relate to the sequence of storage of data;

FIG. 4 relates to synthesis of video output from signals for successive bearing increments;

FIGS. 5a and 5b relate to CORDIC transformation;

FIG. 6 shows a method of encoding angular information;

FIGS. 7, 8 and 9 relate to the comparison of contours at differing ranges;

FIG. 10 relates to the synthesis of bearing information for differing ranges;

FIG. 11 relates to the control of contour information;

FIGS. 12 and 13 show visibility hardware;

FIG. 14 relates to earth's curvature correction;

FIGS. 15 and 16 show and explain a circuit for ascertaining minimun visible height at any range; and FIGS. 17 and 18 show and explain brightness circuits.

GENERAL DESCRIPTION

The principal elements of the digital coastline generator of the present invention are shown in FIG. 1, and these elements, and their principal functions, can be briefly summarised as follows:

(a) A main system processor 10 which controls the position of radar-carrying ships in a playing area containing the coastline whose radar image is to be simulated in response to input signals representative of initial positions, courses and speeds of these ships. The processor 10 also permits setting of the parameters (e.g. aerial scanning rate, range) of the radar or radars to be simulated.

(b) A main store 12 which holds all the data to define the coastline, buildings and other features in the playing area.

(c) An interface 11 to the main system processor 10.

(d) A micro-processor 14 which, dependent on the position of the Own Ships, tells the hardware which data must be used to provide the radar video output for aerial sectors of 5.6 degrees at a time.

(e) CORDIC co-ordinate transformation circuitry 16 and an associated interface 34, which takes Cartesian data from the main store under control of the micro-processor 14. They interpolate between points or skip them in dependence on range and bearing, convert the points to polar co-ordinates and load them into the sorting store in such a way that the topography can later be calculated. Cartesian-to-polar co-ordinate conversion is a well known technique, and is described for example in a paper by J. E. Volder entitled "The CORDIC Trigonometric Computing Technique" in I.R.E. Transactions on Electronic Computers, September 1959, pages 330 to 334. An implementation of the technique is described in our UK Patent Specification No. 1 331 410.

(f) A sorting store 18 which has two halves, one being written into (from the Cordic interface 34) while the other is read. The range and bearing data written into it comes in the order of the X and Y data from the main memory. It is read in range order on successive bearing increments.

(g) Visibility hardware 20 which reads data from the sorting store 18, and computes the earth's curvature, the height of the land at each range and the minimum height of land that is visible at that range. It defines the land as being visible unless it is less than the minimum visible height. It computes a brightness and probability of detection, dependent on the angle of incidence between the radar beam and the land (determined, for example, from the closeness of contour spacings).

(h) A beamwidth store 22, which receives the data computed by the visibility hardware 20: at any one time, the beamwidth store 22 contains the data from four bearing increments computed by the visibility hardware. It generates a video output at 24 by mixing the contents of three of these increments while the fourth is being loaded. The weightings of the three increments used may be varied to change the effective beamwidth of the simulated radar.

(i) A PPI display unit 26, coupled to receive the video output at the output 24 of the beamwidth store 22.

These elements are interconnected by various data highways, namely the main store highway 27, the Cordic highway 28, the sorting store highway 29, the beamwidth highway 30 and the micro-processor bus 32, as shown in FIG. 1. The interface 34 interconnects the Codic circuitry 16 with the main store and sorting store highways 27,29. Access to the main and sorting stores 12, 18 is controlled by respective paging units 36, 38, while communication on the beamwidth highway 30 is controlled by a beamwidth highway control unit 40.

A more detailed explanation of the operation of the digital coastline generator of the present invention will now be given.

FORMAT OF DATA STORAGE

Data defining the features in the playing area is held in the main store 12, a Semi-Conductor Random Access Memory. The data consists of "strings" which follow the outline of the coastline, height contours or outline shape of the features to be described. The strings start at a point on the outline and are a sequence of short vectors following the outline. The points are defined by 16 bit numbers to give a resolution of 1/256 n.m. (approximately 8 yards) in 256 nautical miles for both Northings and Eastings. The vectors are of either 1/64 n. mile (32 yards) for N, S, E or W, or √2/64 n. mile for NE, SE, SW or NW. Thus each end of any vector will be on a 1/256 n. mile (8 yard) grid, and the vectors may be defined by a 3 bit code as there are only eight possible variations. See FIG. 2.

The height parameter of the strings is defined by a four bit code. Each of the sixteen possibilities may be set to any height between zero and 3,150 ft in increments of 50 ft. The strings may also be defined as blanking or non-blanking features, or contours to define the land.

The data is divided into groups, each group containing the data for a square of side 2 nautical miles.

CORDIC INTERFACE FUNCTION

The Cordic interface hardware 16, 34 takes string data in Cartesian co-ordinates from the Main Store, converts it to Range and Bearing (i.e. polar co-ordinate form) and selectively passes it to the sorting store. In order to keep the amount of data that has to be computed to a minimum, only the data within range of the radar is passed to the cordic interface hardware. It would be possible for the sorting store to contain all the data for a complete 360 degree rotation. However, in order to reduce the quantity of storage required only 11.25 degrees of store is provided. This is divided into two 5.625 degree segments. One segment is loaded by the cordic interface hardware while data already loaded is read from the other half of the store by the visibility hardware.

In order to minimise the data computed even further, the micro-processor defines to the cordic interface hardware which of the 2-nautical-mile squares of data are required to be converted for each 5.625 degree segment. This is achieved by providing the cordic interface hardware with a list of "pointers". These pointers are loaded into a section of the main memory called the "scratch pad". The pointers are the addresses in the main store at which the data for the relevant squares may be found. See FIG. 3.

When the range and bearing of the first point in each string has been computed, the cordic interface uses the range and bearing to decide whether it should interpolate between points on the string (if the range is short) or use only every second or fourth point (if the range is long or if the bearing is such that even the larger step size will not allow the nxt point to be within the 5.6° sector being prepared for the sorting store). This decision ensures that the processing is kept to a minimum at long ranges where the simulated radar's discrimination is worst, while giving an artificially higher discrimination at short range. It also avoids doing unnecessary computations at small step size when even large step sizes will not produce data within the 5.6° sector. The range from subsequent computations is used to decide on the interpolation or skip used as the vectors progress round the strings.

Each point converted will result in a range and bearing. These ranges and bearings are used in groups of three to decide whether or not there should be an output to the sorting store. This decision is designed to ensure that from any closed contour there will always be an even number of crossings on any bearing increment. Also when any data is written into the store, the store is read first to decide whether that data is overwriting any other data. If so further decisions must be taken to ensure the rule of even numbers of crossings is maintained, as will be described hereinafter with respect to FIGS. 7 to 9.

As the cordic interface takes data from the main store in string order the polar co-ordinates resulting from the co-ordinate conversion are not in range or bearing order. As the eventual output must be in range and bearing order some form of sort must be achieved. It is performed in this case by allocating an address to each range and bearing cell in the 11.25 degrees held in the store. Thus, when the height and description of all the data has been loaded into the appropriate range and bearing cells for each point on the strings, the sorting store may be read for each successive bearing increment and the data retrieved in range order.

The data retrieved contains both "contour information" and "point information".

CORDIC INTERFACE HARDWARE (34) (see FIGS. 5 and 3)

The cordic interface hardware takes its data from the main store 12 on the data highway 27. For each Own Ship the first two words of data to be read are the ship's position in Easting and Northing which are loaded into registers 1 and 4 respectively (FIG. 5a). The next word is the address from which to fetch the data of the first two mile square specified by the scratch pad area of the main store (see FIG. 3a).

The data defines the coastline and other features in the two mile square. The hardware then collects the first word of data from that square. This defines the number of strings in the square (FIG. 3b). The next two words define the Eastings and Northings of the start of the string. The string data is loaded into counters 2 and 5 respectively. The subtractors 3 and 6 have on their outputs therefore the Eastings and Northings of the start position of the string relative to the Own Ship. These Northings and Eastings are then passed to the cordic transformer (7) for transformation to Range and Bearing. This range and bearing is passed to the next stage of the Cordic Interface but the range is also returned to control the use of increments in the string (in 8) to obtain appropriate apparent discrimination, as mentioned earlier.

The string is made up by successive incremental steps. Each step has one of eight possible lengths and directions. (FIG. 2).

These eight possible increments are defined by a 3 bit code the codes being tightly packed into 16 bit words (i.e. 16 increments are defined by the 48 bits of three 16 bit words).

If the range is between 2 and 4 nautical miles the count in one or both of the counters—which have an 8 yd LSB—is either incremented or decremented by 4 (32 yds), in accordance with the code of the incremental step. This causes the counters 2 and 5 to contain the N and E positions of the next point on the string. This position is then passed to the codic for transformation to Range and Bearing in the same way as the first point. This continues to the end of the string, provided that the range remains between 2 and 4 nautical miles.

If the range is greater than 4 nautical miles and the data represents contour information, every increment is used in the counters but a co-ordinate transformation only takes place in every second increment between 4 and 8 nautical miles and on every fourth increment for ranges greater than 8 nautical miles.

If the range is less than 1 nautical mile the co-ordinate transformation is performed on every increment or decrement of the counter i.e. every 8 yards or every other increment if the range is between 1 and 2 nautical miles. (There are four increments of the counters for every increment in the string, and four transformations are thus performed for every incremental step along the string. Each increment of a counter is in this case of value 1).

Further if the range and bearing that are received from cordic are such that even by progressing eight increments along the string before computing another range and bearing, the latter range and bearing cannot be within the 5.6 degree sector currently being produced, then the cordic interface circuitry will only pass the eight point to the cordic transformer. Similarly if the range and bearing are such that four, two or one increments may be taken before the string enters the sector, then the appropriate maximum number of increments will be taken before another cordic transformation is performed.

Each range and bearing from Cordic represents one of the points from the string. It is necessary to pass this data to the sorting store selectively such that all points are loaded into the sorting store but such that a closed contour will appear as an even number of entries in the sorting store on any bearing increment. See FIG. 7.

If the even number of crossings is achieved then it is known that all the land between the crossings is higher than the contour if the datum is below.

If it is assumed that all contours are in strings with the high ground on the right when proceeding along the string, then the even number of crossing rule may be achieved by continuous inspection of 3 successive points. See FIGS. 8a and 8b. The aim is to store in the sorting store only front and back edges of continuous loop contours. in FIG. 8a, a front edge is show; in FIG. 8b, a back edge is shown. In both FIGS. 8a and 8b points 2, 3 and 4 are on the same bearing increment as each other; also 1 to 2 and 4 to 6 are on the same range increments.

Inspection of points 1, 2 and 3 show that in FIG. 8a, 2 is on a front edge, and in FIG. 8b, 2 is on a back edge. Therefore both the points would be loaded into the sorting store.

Inspection of points 2, 3 and 4 shows in both cases that point 3 is on the line of sight to point 2 and should therefore not be transferred to the sorting store. This is also true for point 4. Inspection of points 4, 5 and 6 shows that point 5 is on a front edge in FIG. 8a and a back edge in FIG. 8b and therefore should be loaded into the sorting store. A set of rules for all combinations of 3 points may be specified which guarantee the even number of entries rule. This is shown in FIG. 9.

The bearings considered may be in the 5.6 degree sector or outside it. They may also be either in adjacent bearing increments or not.

If two successive computations give bearings which are not in adjacent bearing increments then all the bearing increments between must be filled to meet the two crossing criteria. See FIG. 10. Points A and B are 32 yards apart at a range of 1.28 n. miles from the radar R and therefore subtend 0.7 degrees and are in adjacent bearing increments thus putting one entry into each bearing increment. Points D and C are also 32 yards apart but only at a range of 0.64 n. miles from R and there subtend 1.4 degrees. There would therefore be no result from the cordic on the line R B between C and D unless this filling occurs at point F.

Two successive points over the boundary of the 5.6 degree sector will cause any necessary filling to occur from the edge of the sector to the point in question.

The bearing passes from Cordic (7) onto circuitry (9) (FIG. 5b). This circuitry subtracts the angle represented by the start of the 5.6 degree segment being computed from the bearing received. This differential angle is coded into one of 12 segments. See FIG. 6.

The codes for three successive computations $\theta_1$, $\theta_2$ and $\theta_3$ are available at any time by shifting them into registers 10 and 11 as each new transformation occurs.

The ranges of successive computations are compared in 13 to give range differences R1-2 and R2-3 by the use of registers 12 and 14 which are clocked after each transformation.

The information $\theta_1$, $\theta_2$, $\theta_3$, R1-2 and R2-3 is passed to PROM 15 which is programmed with the decisions of FIG. 9 to decide whether the point should be passed to the sorting store and, if it is, which bearing increments should be filled. The decision of which bearing increments should be filled depends on the segment in FIG. 6 that the bearings $\theta_1$, $\theta_2$ and $\theta_3$ are in. The PROM 15 also controls the filling of intermediate bearing increments as described earlier.

The sorting store is organised such that every range and bearing cell in the 11.25 degree segment has a unique byte address. The byte of data defines the contours or other features to be found in that 0.7 degree by 32 yard cell. The data is two bits of type code, four bits of height code and two bits of range. These bits define the range to 8 yards at which the feature is to be found.

It is possible for a contour to legitimately pass through the same 32 yard range and bearing cell twice. If only one entry were to result, the rule of even numbers of crossings would be broken. See the Isthmus in FIG. 11. In this situation the rule must be preserved. This is accomplished by reading the sorting store while it is being written to see whether there was data there already. (A location containing zero has not been written into). If data had been written previously:

A contour takes precedence over a point

A higher contour always takes precedence over a lower one

If a contour overwrites one of its own height the cell will be cleared

If the contour with higher priority has been overwritten then the storage location will have its original data rewritten by the cordic interface hardware.

VISIBILITY HARDWARE

In order to rebuild the topography as seen from the radar location, from the contour and point data held in the sorting store 18, the hardware must interpolate between successive contours and provide peaks at the tops of hills. In oder to do this, it is necessary for the hardware to know the height of the suceeding contour when any contour is reached. This is done by loading range, height and type information into a buffer memory 200 in which successive contours are held in successive addresses with points held separately but also in successive addresses.

To achieve this splitting the hardware reads the sorting store 18 through all the addresses of each bearing increment in range order. When a piece of data is found it is loaded into the temporary memory 200 at either the bottom address if it is a contour, or the top address if it is any other data. There are two address counters, one for contours (not shown) which counts up from the lowest address and one for other data which counts down from the highest address. After each piece of data has been loaded, the appropriate address counter is either incremented or decremented and the next piece of data is searched for in the sorting store 18. If more than 127 pieces of information are found in the sorting store, the temporary store 200 will be full and all other information on that bearing will be lost. Since the sorting store 18 is read in range order, if the temporary store 200 is full only data at long range is lost. When maximum range is reached both the contour and point lists are loaded with a flag to indicate end of data.

The visibility hardware computes the heights of the land at any range along each bearing increment by interpolation between the contours, which it takes from the temporary store. To do this, the hardware must know the range and height of the previous and next contours. As the rage of each contour or point is reached in counter 201 and as detected by comparators 220 and 230, the next contour or point is read from the temporary store (FIG. 12) into latches 101, 103 and 240, 250 and this continues until end of data is detected. Having obtained the range and height of the previous and next contours in latches 100, 101, 102 and 103, (FIG. 13), the difference in range and height between the contours is computed by adders 104 and 105. The difference in height between the contours controls a binary rate multiplier (BRM) 106 which is driven by a clock which has a positive transition every four yards of range. The BRM output counts down a counter 107 which was loaded with the difference in range between the contours. Every time the counter reaches zero the counter 108 is incremented or decremented depending on whether ΔH was positive or negative, and the counter 107 is reloaded with ΔR. The height of other obstructions is then selected at the range the points occur, to produce the topography of both contours and points output from multiplexor 109. The height is then modified by a correction for earth's curvature by adder 110.

The correction for earth's curvature is achieved by approximating the curvature of the earth after the horizon to a square law (See FIG. 14). The counter 111 is cleared at zero range and is clocked at 64 yards intervals. The outputs of this counter are used to control the BRM 112 which is clocked by the same clock and the output of this BRM then clocks the counter 113. Since the control input to the BRM 112 is gradually increasing with range, counter 113 holds a height which is increasing approximately with the square of range. This height is then compared with the Aerial height from 260 in comparator 114 and when they are equal the horizon has been reached. At this point, counters 111 and 113 are cleared and the height correction due to the earth's curvature is enabled by circuit 115 to affect the current height of land. The current height of land output from adder 110 (FIG. 13) now includes all land up to maximum range even if it is not visible to the radar. This is illustrated by FIG. 15 with the ship at $R_0$, a nar peak of height H, at range R, and a further peak of which the shaded area is not visible. At any range $R_2$ beyond $R_1$ the minimum visible height must be given by $$H_2 = \frac{R_2}{R_1} \cdot H_1$$

In order to take this into account, the minimum visible height is computed continuously and compared with the current height of the land, as shown in FIG. 15. Initially the minimum visible height counter 116 (FIG. 16) is set to zero and is compared with the current height in comparator 117. When the current height becomes greater than the minimum visible height (MVH), latch 118 is loaded with the current range and latch 119 is loaded with the difference from 270 between the current height and the aerial height. The output of this latch 119 controls a BRM 120 which is clocked every 4 yards. The rate output of the BRM counts down counter 121 and when this counter reaches zero it is reloaded with the range of the last visible land from latch 118, and it also increments or decrements the minimum visible height counter 116 depending on whether the land is higher than the aerial. Thus the minimum visible height will follow a line MVH as shown in FIG. 15. If the current height of the land is less than the minimum visible height, it is invisible. Having now determined which sections of the topography are visible, these sections are given a brightness which depends on the current range and height, the aerial height and the slope of the land. Basically, the brightness will depend on the angle of incidence between the radar beam and the land as shown in FIG. 17, and consequently depends on the factors given above. It may be seen from FIG. 17 that the angle of incidence will decrease as the range increases from $R_1$ to $R_2$ and due to the rough calculation, a further factor has been added namely a function of the range after the coastline to make the brightness decay exponentially behind the coast. This computation is done using a number of PROMS (See FIG. 18). A PROM 130 is used to divide ΔH by ΔR to produce the slope of the land at the current position. A second PROM 131 divides the difference between the current height and the aerial height by the current range. Both these outputs drive a further PROM 132 along with the range after the coastline value from 136 to produce the final brightness.

The video return from the land is given a mottled appearance by modulation with a pseudo random noise signal. Two shift registers 133 form the pseudo random noise sequence (PRBS) and this is varied from bearing to bearing by selecting different sequences. This is done by latching the range of the coastline into latch 134 and using this to select which sequence will be used. In general not many bearings have the same range to the coastline to an 8 yard accuracy. Thus the pseudo random signal produced from the shift registers will vary with bearing. Since the brighter the echo the greater is the probability of receiving an echo, the outputs from the pseudo-random sequence are compared with the brightness from PROM 132 in comparator 135, the output of which modulates the brightness via gate 137 to produce the mottled effect.

The data thus defining the brightness at each range increment is passed to the beamwidth store. The beamwidth store has one cell for each range increment on each of four bearing increments. It is arranged that while the data is being computed and loaded for one bearing increment by the visibility hardware the other three bearing increments are being used to provide the video output. See FIG. 4.

As the apparent center of the beamwidth moves across bearing increment 2, bearing increment 4 is being loaded. There are four separate steps of the aerial movement for each increment of bearing. This creates an apparently greater angular resolution than has actually been computed and smoothes over the "digital" effect that would occur if only one increment were used at a time. Different weightings of the bearing increments are taken in order to simulate a low return power at the edges of the beamwidth and these weightings are changed at each of the four bearing steps to contribute to the above-mentioned smoothing.

We claim:

1. Digital simulation apparatus for simulating a terrain-representative display of the kind produced by a movable scanning-type display device, comprising:
    a main store for storing data representative, in a first co-ordinate form, of the terrain in a predetermined area, said data being divided into groups corresponding to respective contiguous zones of said area;

means for producing a signal representative of the current position of the scanning-type display device;

co-ordinate conversion means for converting data in the first co-ordinate form into data in a second co-ordinate form suitable for use in the scanning-type display device, said first and second co-ordinate forms being different from each other;

a further store for receiving the converted data; and means for generating the simulated display from the converted data in the further store;

wherein the means for producing the position-representative signals is also arranged to produce successive signals respectively representative of successive segments of scan of the scanning-type display device;

and wherein there is provided means responsive to the position-representative signals and the scan-segment-representative signals to select from the main store only groups of data corresponding to zones of said area determined by the current position and current scan segment and to apply the selected data to the co-ordinate conversion means for conversion therein.

2. Apparatus according to claim 1, wherein the means for producing the position-representative signals is also arranged to produce signals representative of the range and bearing corresponding to data to be converted, the selecting means being additionally responsive to said range and bearing signals to select only portions of said selected groups of data for conversion.

3. Apparatus according to claim 2, wherein the means for producing the position-representative, scan-segment-representative, bearing-representative and range-representative signals comprises a main processor arranged to produce these signals in response to input signals representative of position of a simulated vehicle carrying the scanning-type display device, and of the scanning rate and range of the scanning-type display device, at least some of these input signals being selectively variable.

* * * * *